UNITED STATES PATENT OFFICE.

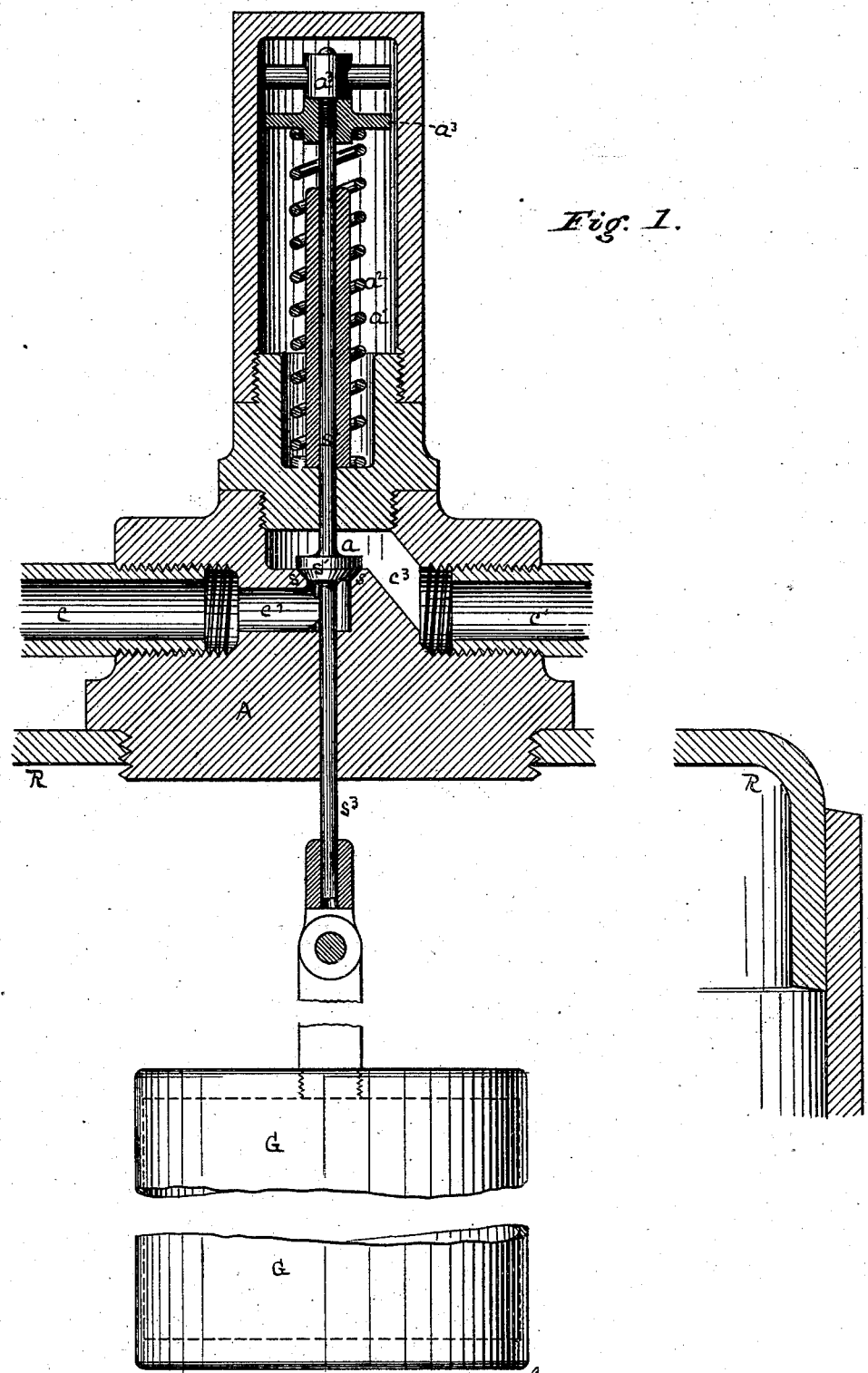

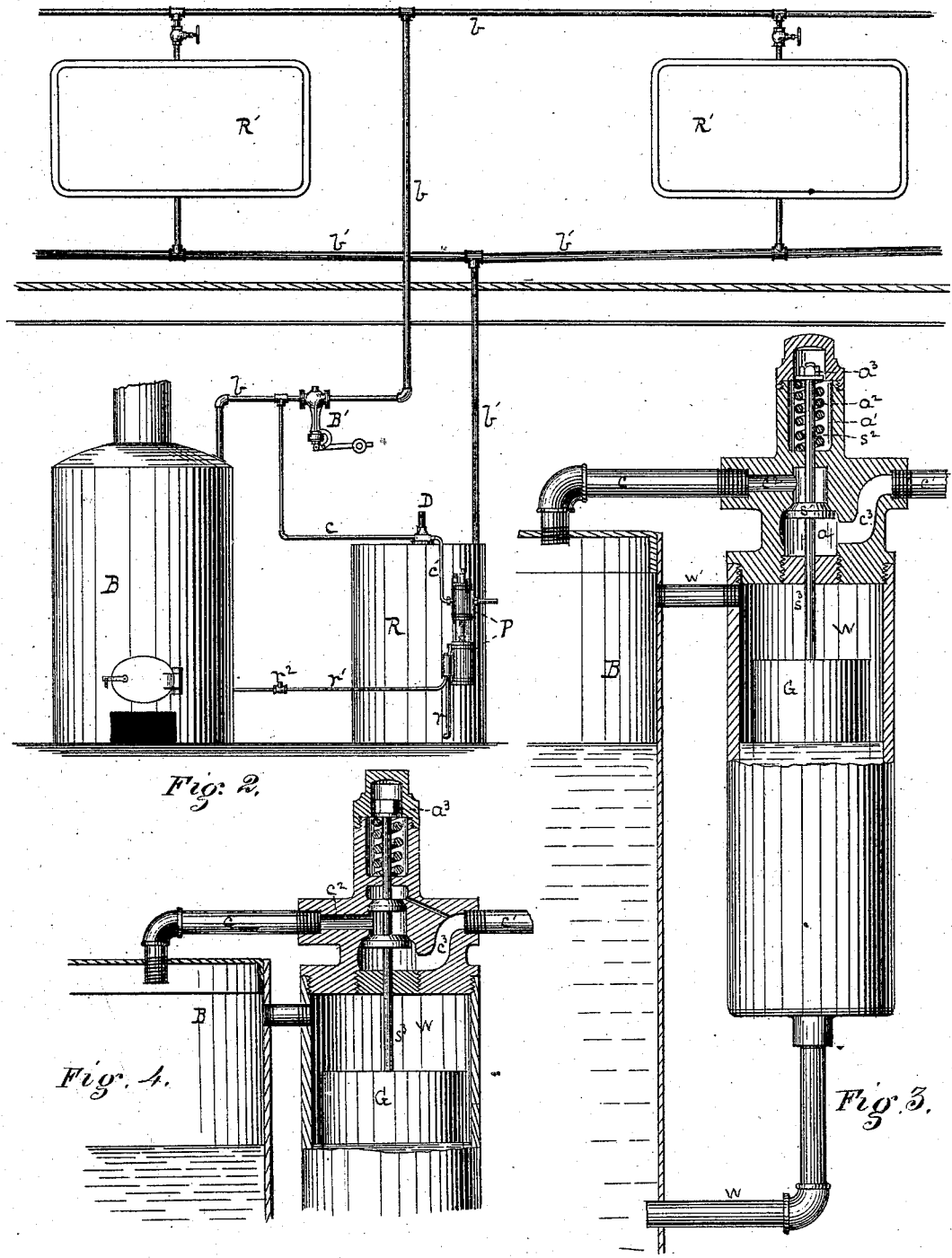

GEORGE WESTINGHOUSE, JR., OF PITTSBURG, PENNSYLVANIA.

FEED-WATER APPARATUS.

SPECIFICATION forming part of Letters Patent No. 239,000, dated March 15, 1881.

Application filed February 7, 1881. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Feed-Water Apparatus; and I hereby declare the following to be a full, clear, concise, and exact description thereof, reference being had to the accompanying drawings, making a part of this specification, in which—like letters indicating like parts—

Figure 1, Sheet 1, is a vertical sectional elevation of a portion of my improved apparatus, illustrating more particularly the manner of combining and using a float, a spring, and a valve, by which to regulate automatically the supply of steam to a feed-pump. Fig. 2, Sheet 2, is a diagram or outline view, in elevation, of a steam-heating apparatus, illustrative of the manner of using therein the devices of Fig. 1. Fig. 3 is a sectional elevation of my improved apparatus as organized simply for boiler-feeding; and Fig. 4 is a like view of so much of the same as is necessary to illustrate the use of a balanced valve in the same combination. Fig. 2 is drawn without any particular regard to scale. Figs. 3 and 4 are approximately to the same scale, and Fig. 1 is to a much larger scale.

One practical difficulty which has been experienced in the use of boiler-floats for opening and closing steam-valves has arisen from the fact that the float is liable to vary in specific gravity under prolonged use, and hence the point or time of opening and closing the valve varies correspondingly. If the float be of wood, it soon absorbs and becomes saturated with water, and consequently sinks to a lower level. If, as is usually the case, it be a hollow copper ball or globe, variations of temperature cause a leakage at the joints, and the steam, entering under pressure, gradually fills the float with water, so that it also sinks to a lower level, or, if it becomes full enough, sinks absolutely, and so ceases to act at all.

Now, in my present invention, instead of using a float in the strict sense of the term, I employ a weight which will, if otherwise unsupported, sink in the water, or which, if hollow, is intended to be filled or so far filled with water that its specific gravity, when in use, shall be greater than that of water; but as such weight, when in use, will be partly supported and carried by the lifting power of the water, and as its vertical motions are similar to those of a float, I will, for convenience, designate it as a "float," only limiting the meaning of that term to a float which, if otherwise unsupported while in use, would sink in the water. With a float of this kind I combine a spring which shall carry a part of its weight, so that by the conjoint action of the water and the spring the valve shall, at normal water-level, be held in any desired predetermined position, and variations from such water-level shall result in the opening or closing of the valve, as the case be.

In an application already filed I have described and claimed such a combination of float and spring; and the present invention relates more particularly to the combination thereof with a feed-pump and boiler, whereby the feed-pump will be caused to operate automatically or cease to operate with varying water-levels. In the drawings I have illustrated this combination both in a steam-heater apparatus and an ordinary boiler-feed.

Referring first to Fig. 2, B may represent a boiler or steam-generator of any suitable construction. A steam-pipe, $b$, passes through any suitable pressure-regulator, B', to one or more radiators, R', arranged in the room, house, or building to be heated, and the drain-pipes from these radiators lead, by a return-pipe, $b'$, to a feed-water tank, R, so that the water of condensation, while still retaining a considerable percentage of its heat, shall be ready to be again fed into the boiler. For this purpose I employ a feed-pump of any suitable construction, and which I have represented at P, the upper cylinder representing the engine and the lower cylinder the pumping-cylinder. The latter takes its supply from the tank R by a pipe, $r$, and the feed-water is forced thence into the boiler by a pipe, $r'$, having a check-valve, $r^2$. Steam for driving the pump is taken from the generator or from the pipe $b$ by a pipe, $c$, which leads to the pump-regulator D, and thence, by pipe $c'$, the steam goes to the pumping-engine.

The pump-regulator D is shown to an enlarged scale in sectional view in Fig. 1, to which reference may now be made. Here R represents a portion of the tank. In a hole made therein I secure a plug, A, constructed substantially as shown, or otherwise, so as to have a port, $c^2$, with which the pipe $c$ is connected, a port, $c^3$, with which the pipe $c'$ is connected, an intermediate valve-chamber, $a$, and valve-seat $s$, whereon to seat a valve, $s'$. The upper end, $s^2$, of the valve-stem extends up into a spring-chamber, $a'$, whereon is a spring, $a^2$, kept under compression by an adjustable nut and collar, $a^3$, so that it shall carry a portion of the weight of the float G, with which it is connected through the valve-stems. The lower end, $s^3$, of the valve-stem projects into the tank R, and carries a float, G, which may be made of any suitable form or material, such as a piece of metal tubing closed at its lower end and filled or partly filled with water; or it may consist of a solid disk or block of stone, metal, or other relatively heavy material, and it should have a gravity, when thus used, such that it would, if not supported otherwise than by water, sink to the bottom.

The lifting power of the spring should be somewhat less than the weight of the float in the open air and somewhat greater than the specific gravity of the float when partially immersed in the water or sunk to the ordinary working depth; and, while I do not limit myself to exact relative proportions, I believe the best results will be secured if the spring have a lifting power equal, or about equal, to the weight of the float in the open air less one-half the difference between such weight and its weight when immersed in the water to ordinary working depth, subject, however, to variation or to increase or diminution, according as the steam-boiler pressure (which is assumed to be constant, or nearly so) may act on one side or the other of the valve; but if a balanced valve be used such element of variation may be disregarded. But, for the purposes more particularly illustrated in Figs. 1 and 2, the organization is such that, assuming the float to stand at such water-level that the valve will be closed and held closed with only the proper force, then, as by the further or continued inflow of the water of condensation into the tank R such water-level is raised, the float G will be correspondingly lifted or lightened, so that by the steam-pressure and spring-action the valve $s'$ will be raised more or less from its seat, and the steam so passing through to the pump will start it in operation and pump water from the tank R into the boiler B. As soon as the water-level is thus lowered sufficiently for the unsustained weight of the float to exceed the effective force of the steam-pressure on the under side of the valve plus the lifting power of the spring, the valve $s'$ will be seated, and in consequence of the cutting off of the steam the pump will stop; and while, for purposes of clearness, I have described this operation as intermittent, it will be found that, if the apparatus be carefully constructed and adjusted for any desired water-level in the tank, the valve will, under the conditions named, ordinarily be raised just far enough for the supply of sufficient steam to the pump to keep the latter constantly in operation at such speed that water will be pumped into the boiler just as fast as it is condensed and returned to the tank. The operation will then be practically continuous.

The waste or exhaust steam of the pump may be discharged directly into the tank and condensed, or may go into pipe leading into the radiators, or if wasted the deficiency may be otherwise provided for; and here it may be added that a high steam-pressure may be required in the boiler for ordinary purposes of power, while a much lower steam-pressure will suffice for the radiators; hence in such cases the exhaust-steam of the pumping-engine, being exhausted into the radiators or radiator-pipes, may be fully utilized.

In Fig. 3, where (as also in Fig. 4) like letters as already used indicate like parts, I have illustrated the combination of substantially the same apparatus as employed for ordinary boiler-feeding, but with such modifications as are necessary to fit it for this use or render it simpler in construction. In this use no return-tank is required, as on a high-pressure engine none is used.

The float may be arranged directly in the boiler, or, what is generally better, in a float-chamber, W, which may be arranged alongside the boiler and have a pipe-connection, $w$, therewith, so that both shall have the same water-level. The steam-space of the boiler is connected with the upper part of the chamber W by a pipe, $w'$. The valve $s'$ in this case is arranged to seat upward instead of downward, as in Figs. 1 and 2, so that as the water-level lowers the float, going down with it, will open the valve and allow steam to go to the pump, as before, by a like arrangement of ports and connections. Ordinarily, if the devices are well constructed and adjusted, the valve will be held just so far clear of its seat as to supply enough steam to the pump to keep it running at the right speed for keeping up the supply of water in the boiler as fast as it is used in making steam—or, in other words, so that a uniform water-level will be maintained; but if the pump should at any time happen to work too fast the result will be that the water-level will be raised and the valve closed. As thus organized, steam-boiler pressure acts to unseat the valve. The ordinary amount of such pressure must be taken into account in fixing the relative power to be exerted by the float and spring; but in cases where the boiler-pressure is liable to fluctuate considerably I prefer to employ a balanced valve, as illustrated in Fig. 4. The construction and function of such valves are so well known that they need not be described.

In the combination referred to in Figs. 3 and 4 the pump may take its supply from any suitable source.

I claim herein as my invention—

1. In combination with a feed-pump and boiler, a valve arranged to regulate the supply of steam to the pump, a float connected with the valve-stem, and a spring arranged to carry a part of the weight of the float, substantially as set forth.

2. In combination with a feed-pump and boiler, a pipe leading to one or more heaters, a return-pipe leading into a tank, a float arranged in such tank and carried partly by the water and partly by a spring, and a valve operated by said float and spring, for regulating the supply of steam to the pump, substantially as set forth.

In testimony whereof I have hereunto set my hand.

GEORGE WESTINGHOUSE, JR.

Witnesses:
 R. H. WHITTLESEY,
 GEORGE H. CHRISTY.